CRYSTAL CONTROLLED TELEVISION TUNER

Filed Dec. 14, 1954 2 Sheets-Sheet 1

INVENTORS
ROBERT ELAND
RICHARD BULL
By Ostrolenk & Faber
ATTORNEYS

Dec. 16, 1958 R. BULL ET AL 2,864,945

CRYSTAL CONTROLLED TELEVISION TUNER

Filed Dec. 14, 1954 2 Sheets-Sheet 2

INVENTORS
ROBERT ELAND
RICHARD BULL

BY

Ostrolenk & Faber

ATTORNEYS 2,864,945

CRYSTAL CONTROLLED TELEVISION TUNER

Richard Bull, South Pasadena, and Robert Eland, Arcadia, Calif., assignors to Standard Coil Products Co., Inc., Los Angeles, Calif., a corporation of Illinois Application December 14, 1954, Serial No. 475,132

4 Claims. (Cl. 250—20)

The present invention relates to television tuners and more particularly to television tuners for reception of color television signals.

One of the most successful television tuners today is the so-called turret type, disclosed in Patent No. 2,496,183. In this television tuner, selection of V. H. F. channels is obtained by rotation of a turret carrying tuned circuits with respect to stationary circuits comprising an R. F. amplifier tube, an oscillator tube, and a converter tube with their related circuitry. The turret is provided with a detenting device so as to permit positive selection of a desired channel. Since there are twelve V. H. F. channels, the turret is provided with twelve positions corresponding to twelve sets of tuned circuits, each set for each V. H. F. channel.

When, early in 1949, the U. H. F. band was proposed to cover additional seventy channels, the need for means to tune in any of the new seventy channels was immediately apparent and research was done in this direction. In order to adapt the above mentioned turret tuner for reception of U. H. F. channels, use was made of the fact that in any single locality in the United States, at most seven of the possible twelve V. H. F. channels were assigned for actual television transmission.

In fact, additional strips were developed which could be easily substituted for the unused V. H. F. strips. These strips used a double conversion method for bringing the U. H. F. signal to the I. F. level.

As a further development in the ultra high frequency field, a new strip was developed in 1953 which used single conversion from ultra high frequency signals to I. F. having lower noise figure than the previous one, less spurious response, and improve sensitivity.

Recently, however, the latest industry dream, color television, is approaching reality and with it, technical aspects much more stringent than those imposed on black and white television. As is well known in the art, one of these is a rigid requirement on drift of the local oscillator in the color television tuner. At the present time, industry has agreed tentatively to a maximum of + or — 50 kc. drift in order to maintain true color rendition.

While this maximum drift may be possible at very high frequencies (from approximately 50 to 220 mc.) with a self-excited oscillator at ultra high frequencies (approximately 400 to 900 mc.), this represents a maximum possible drift of .005%, and thus dictates the use of an extremely stable oscillator, for example, a crystal controlled oscillator.

It is known, however, that operation of crystals above thirty megacycles in their first overtone is impractical due to the extreme thinness of the quartz. Recently, however, overtone operation of crystals was developed so that operation up to one hundred megacycles in commercial units is possible where these commercial units have a minimum thickness of eighty microns.

Overtone of a crystal may be described as an electrical method of slicing a crystal to a thinness not possible by mechanical methods. A crystal mechanically cut for a fundamental frequency of 8.478 megacycles can be operated by using the proper circuit at a number of overtones, for example, the third, the fifth, the seventh, the ninth and the thirteenth, where these overtones do not coincide exactly with the corresponding harmonic frequencies of the fundamental since harmonics can only be obtained electrically while crystal overtones are the result of pure mechanical vibration.

In the above example, while the eleventh overtone may be 93.284 megacycles, the eleventh harmonic is 93.259 mgacycles. In order to operate at one of these mechanical overtones, a crystal must be used in an oscillator circuit provided with an inductance in shunt with the crystal while operating the crystal as a capacitive impedance when energized at a frequency below the series resonant frequency of the equivalent inductance and capacitance of the crystal as is known in the art.

This is necessary since overtone operation of a crystal connected between the grid and the cathode of the controlled oscillator is at a high impedance. By shunting an inductance across the overtone crystal, the crystal is then combined with an input circuit that is inductive and thus forms an anti-resonant grid circuit having the desired high impedance. The value of the shunt inductance is selected so that the combination of the normal circuit capacitance and the shunt inductance appears at a high value inductance at the operating frequency of the crystal.

As previously mentioned, however, even using a crystal in one of its high mechanical overtones, it was only possible to reach a frequency of oscillation of the order of magnitude of one hundred megacycles. To enable crystal control in the ultra high frequency band, high electrical harmonics from a crystal operating in a high overtone may be used to produce the desired I. F. in a single conversion.

In particular, it is found that by overtone operation from 103.4 mc. to 133.0 mc. and by using the fifth, sixth or seventh harmonic of the overtone frequency, tuning of the complete U. H. F. band is possible.

One object of the present invention is therefore a color television tuner having an oscillator drift not greater than .005 percent.

The frequency control in crystal and the additional circuit components necessary for single conversion from U. H. F. to I. F. can be mounted on strips basically of the same type as the ones heretofore developed for V. H. F. to I. F. single conversion since the local oscillator still operates at a V. H. F. frequency and the frequency controlling crystal is of sufficiently small dimensions that it can be mounted in one of the strips secured to the rotating turret. Such a strip of course must also contain the converting element which, in this case, as in the previous U. H. F. strips, consists of a crystal mixer.

Accordingly, another object of the present invention is a color converter in which the frequency controlling element and the mixer are mounted on either a single or a pair of strips, the strips being mounted on a turret with the local oscillator stationarily mounted on the chassis of the converter.

In other words, through the use of the frequency controlled oscillator of the present invention, it becomes possible to utilize the above mentioned turret tuner for reception of color television signals.

In the present crystal controlled oscillator, good operation is obtained by introducing negative feed-back through the distributed capacitance of a coil which also serves to feed the plate winding of the oscillator tube from the D. C. supply.

A further object of the present invention is a crystal controlled oscillator operating with a certain amount of negative feed back for improved performance.

It is well known that crystal controlled oscillators operating at a mechanical overtone can vary in frequency within a narrow range where this variation is achieved by a capacitor connected, for example, between the plate and the grid of the oscillator tube or between the plate and ground.

However, the capacitance value of this fine tuning capacitor cannot be less than a minium value so as not to adversely affect the operation of the crystal controlled oscillator.

Accordingly, in the present invention an additional capacitance is connected in shunt with the fine tuning capacitor to provide a lower limit in the fine tuning capacitance. Furthermore, through the use of the present crystal controlled oscillator, the desired injection current in the crystal mixer can be obtained in the complete U. H. F. spectrum with a gain of the complete tuner approaching that of V. H. F. operation with about the same noise figure and image rejection.

Crystal controlled operation of the present oscillator is immediately apparent by sudden shift in frequency as the fine tuning capacitor is varied. This sudden shift enables the viewer at home or a final tester on an oscilloscope to secure crystal controlled operation of the present oscillator with no need for other external equipment such as a frequency meter. The variation in frequency obtainable by the fine tuning capacitor is approximately + or − 200 kc. at ultra high frequency which corresponds to approximately + or − 25 to 30 kc. at the local oscillator operating at V. H. F.

Another object of the present invention is therefore the provision of means for limiting the final tuning range of the fine tuning capacitor.

Another object of the present invention is a crystal controlled oscillator providing the desired injection current in the crystal mixer.

A further object of the present invention is a color television tuner operating at U. H. F. having a performance comparable to present day V. H. F. color television tuners.

Still another object of the present invention is a television tuner which enables the operator to secure crystal controlled operation with no need of other external equipment.

These and other objects of my invention will become apparent in the following description taken in connection with the drawings in which.

Figures 1, 2:
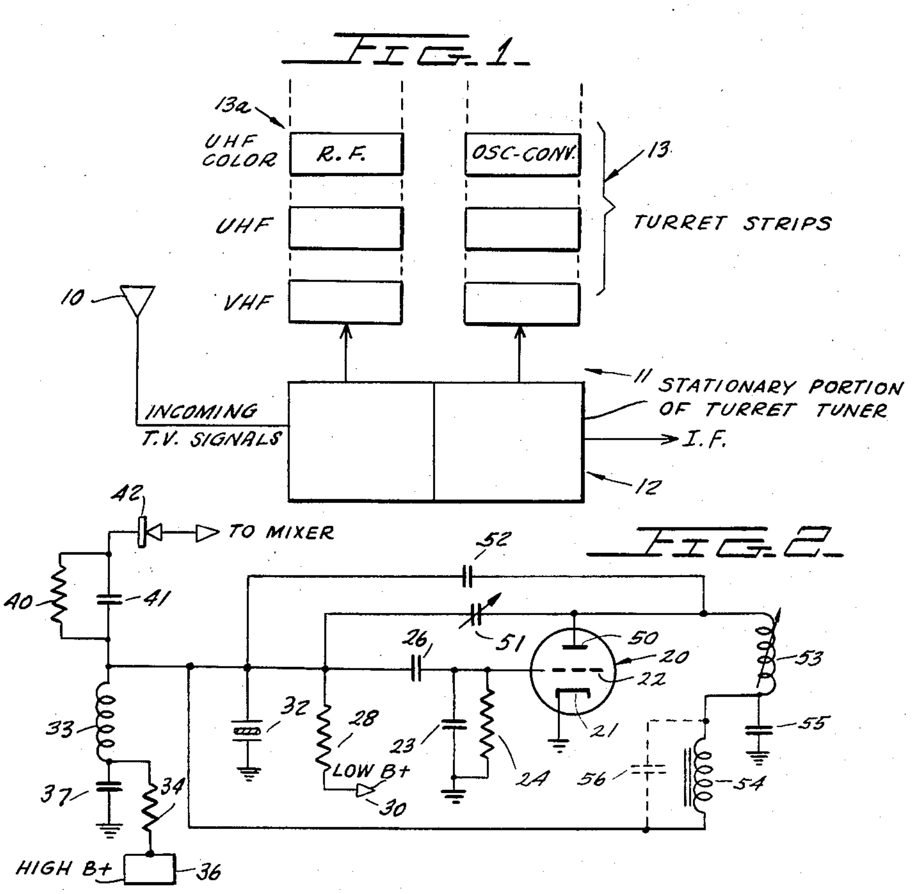
Figure 1 is a block diagram showing the main components of a turret type tuner.
Figure 2 is a schematic circuit diagram of the novel crystal controlled oscillator of the present invention.

Referring first to Figure 1, there is shown in block diagram form the turret tuner to which this invention is applicable. The antenna 10 is here assumed to be of a type capable of receiving V. H. F. and U. H. F. signals. In other words, antenna 10 may actually comprise two antennas, one for V. H. F. and the other for U. H. F. signals. Connected to antenna 10 through a transmission line is the turret tuner 11 consisting of a stationary portion 12 and a rotatable portion 13. The rotatable portion 13 which is cylindrically shaped is here shown expanded into a flat element.

The rotatable portion 13 may be provided with twelve sets of strips so that when this tuner is to operate purely as a V. H. F. tuner, the twelve strips correspond to the twelve V. H. F. channels. When the tuner is to operate as a V. H. F. and also U. H. F. tuner, the unused V. H. F. strips are removed and corresponding U. H. F. strips are substituted therefor where the U. H. F. strips can be either of the double conversion type or the single conversion type.

When used as a color television tuner, some of the unused V. H. F. strips may be substituted by U. H. F. strips having a frequency controlled element, namely a crystal and other electrical components, so that when the color television strips are connected across the stationary portion 12 of tuner 11, a circuit similar to the one shown in Figure 2 is obtained.

In Figure 2 only the oscillator and mixer are shown since the R. F. amplifier section will be in general similar to the one of any U. H. F. strip, for example of the type disclosed in co-pending application Serial No. 341,073 assigned to the assignee of this invention.

In Figure 2 the oscillator tube 20 has its cathode 21 connected to ground and its grid 22 connected also to ground through a parallel R. C. circuit consisting of capacitance 23 and resistance 24. The grid 22 is also connected through a capacitor 26 to a dropping resistor 28 which in turn is connected to a low voltage B+ supply 30. Connected between the junction point of capacitor 26 and resistor 28 on one side and ground on the other is the frequency controlling crystal 32. The high side of crystal 32 corresponding to the junction point between capacitor 26 and resistor 28 is connected to an inductance 33 which in turn is connected to a dropping resistor 34 which is used to increase the plate voltage of tube 20 since it is connected to a higher voltage B+ supply 36 than supply 30. The circuit through which this is achieved will be described hereinafter in connection with the plate circuit of tube 20.

Resistor 34 is here by-passed to ground through a capacitor 37. The same high side of crystal 32 is connected through an R. C. parallel circuit consisting of resistance 40 and capacitance 41 to a harmonic generator crystal 42.

Although not shown in Figure 2, the incoming signal at U. H. F. coming from the R. F. amplifier stage is suitably coupled to a crystal mixer so that at its output which consists generally of a tuned circuit, the desired intermediate frequency is obtained, for example 40 megacycles (see Figure 4).

Plate 50 of oscillator tube 20 is connected to the high side of frequency controlling crystal 32 through a fine tuning capacitor 51 and through an additional capacitor 52 connected in parallel with fine tuning capacitor 51. Plate 50 of tube 20 is further connected to the high side of crystal 32 through a variable plate inductance 53 in series with inductor 54. Inductor 54 is by-passed to ground by a capacitance 55 and is shunted by its own distributed capacitance 56.

It is now possible to describe the operation of the circuit of Figure 2. Crystal 32 is an overtone crystal and is, therefore, capable of operation at a frequency in the V. H. F. range. This overtone operation is made possible by the use of the shunt inductance 33. The electrical harmonic corresponding to that for the selected overtone (e. g. seventh) for the crystal 32 is selected by means of variable inductance 53 in conjunction with the fine tuning capacitance 51. Inductor 54 serves to feed plate winding 53 from the B+ supply 30. However, in order to increase the plate voltage to a higher level while still operating below the maximum plate dissipation of tube 20, resistor 34 is connected to the B+ supply 36 having a higher D. C. voltage than the one of supply 30.

Capacitance 56 appearing across inductance 54 produces negative feed-back from plate to grid which, as is well known in the art, results in improved operation of the oscillator. Capacitor 52 connected across fine tuning capacitor 51 serves to limit the fine tuning range of capacitor 51.

In one embodiment of the present invention, the following components were used:

| | |
|---|---|
| Tube 20 | ½ 6U8. |
| Capacitor 23 | 5 micromicrofarads. |
| Resistor 24 | 10K. |
| Capacitor 26 | 10 micromicrofarads. |
| Resistor 28 | 3.3K. |
| B+ supply 30 | +150 volts. |
| Crystal 32 | 7th overtone, 130 mc. |
| Capacitance 37 | 1000 micromicrofarads. |
| Resistance 34 | 10K. |
| B+ supply 36 | +250 volts. |
| Resistor 40 | 680K. |
| Capacitance 41 | 5 micromicrofarads. |
| Crystal 42 | 1 M 87. |
| Capacitance 52 | 1.1 micromicrofarads. |
| Inductance 54 | 6.8 microhenrys with a resonant frequency of 60 mc. |
| Capacitor 55 | 100 micromicrofarads. |

The inductance value and the adjustability range of inductor 53 is proportioned in accordance with the residual and stray capacities in the overall oscillator circuit, including the interelectrode capacitance from plate 50 to cathode 21 of tube 20, and to be adjusted to resonate at the particular electrical harmonic of the particular crystal 32 that is driven to the mechanical overtone selected. The parameters of inductor 53 also takes account of the selected capacity value for the fixed condenser 52, and the range of the fine tuning condenser 51, as will be understood by those skilled in the art. Similarly, the inductance value of inductor 33 in electrical shunt with the crystal 32 is proportioned to effect the mechanical overtone desired as referred to hereinabove, and as understood in the art.

Using the above components it was found that the injection current in the harmonic generator crystal 42 averaged .5 milliampere in the U. H. F. channels which is, of course, quite satisfactory for this operation. It was further found that the gain approached that of present day V. H. F. tuners and the image rejection was also of the same order.

Figure 3:
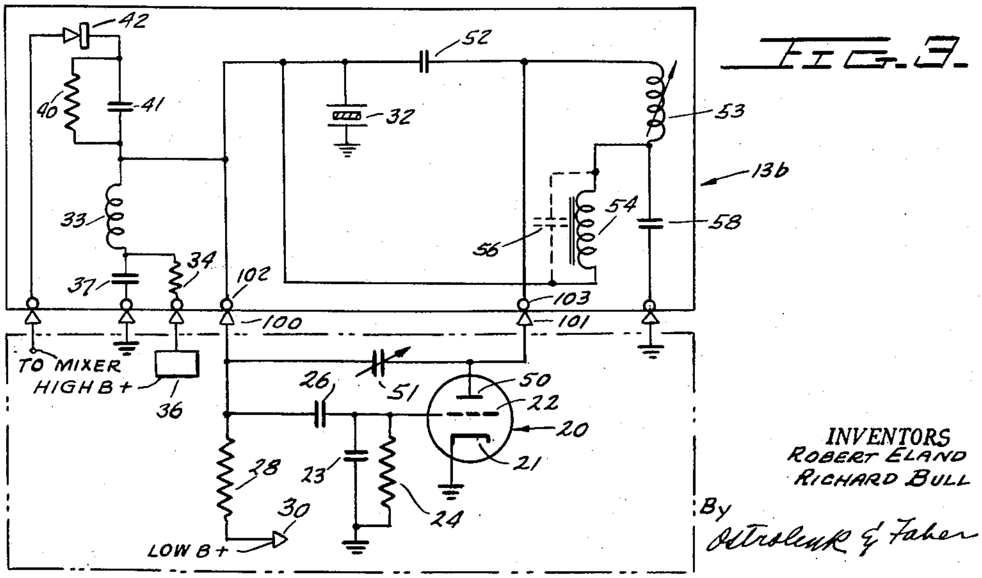
Figure 3 is a schematic circuit diagram of Figure 2 showing the distribution of components on a pair of strips for application of the circuit of Figure 2 to the turret tuner of Figure 1.

Figure 3 shows essentially the circuit of Figure 2 but re-arranged to show which electrical components belong to the stationary section 12 of Figure 1 and which to the rotary section 13 also of Figure 1.

Referring to Figure 3, tube 20, resistor 24, capacitor 23, capacitor 26 and resistor 28 are fixedly mounted on the metallic chassis indicated by the dotted line in Figure 3. Also mounted stationarily on this chassis is the fine tuning capacitor 51. It should be noted that in Figure 3 only the components relating directly to the present crystal controlled oscillator are shown since the other components are now well known in the art.

The junction point of capacitor 26 and resistor 28 is connected to a stationary contact 100 while plate 50 of tube 20 is connected to another stationary contact 101.

When the turret 13 of the present tuner is rotated to one of its color television channels, a strip **13*b* is positioned so that its movable contacts 102 and 103 engage, respectively, the stationary contacts 100 and 101**.

Mounted on strip **13*a* and connected to the two terminals 102 and 103 are the remaining components of the circuit diagram of Figure 2, in particular the frequency controlling crystal 32, the harmonic generator crystal 42, the inductances and capacitances required to complete the circuit and capacitance 52, which as previously mentioned serves to limit the range of fine tuning capacitor 51**.

It is obvious that if the present tuner is to receive more than one color television channel, it must be provided with more strips similar to strip **13*b***, each strip carrying its own tuning elements.

Figure 4:
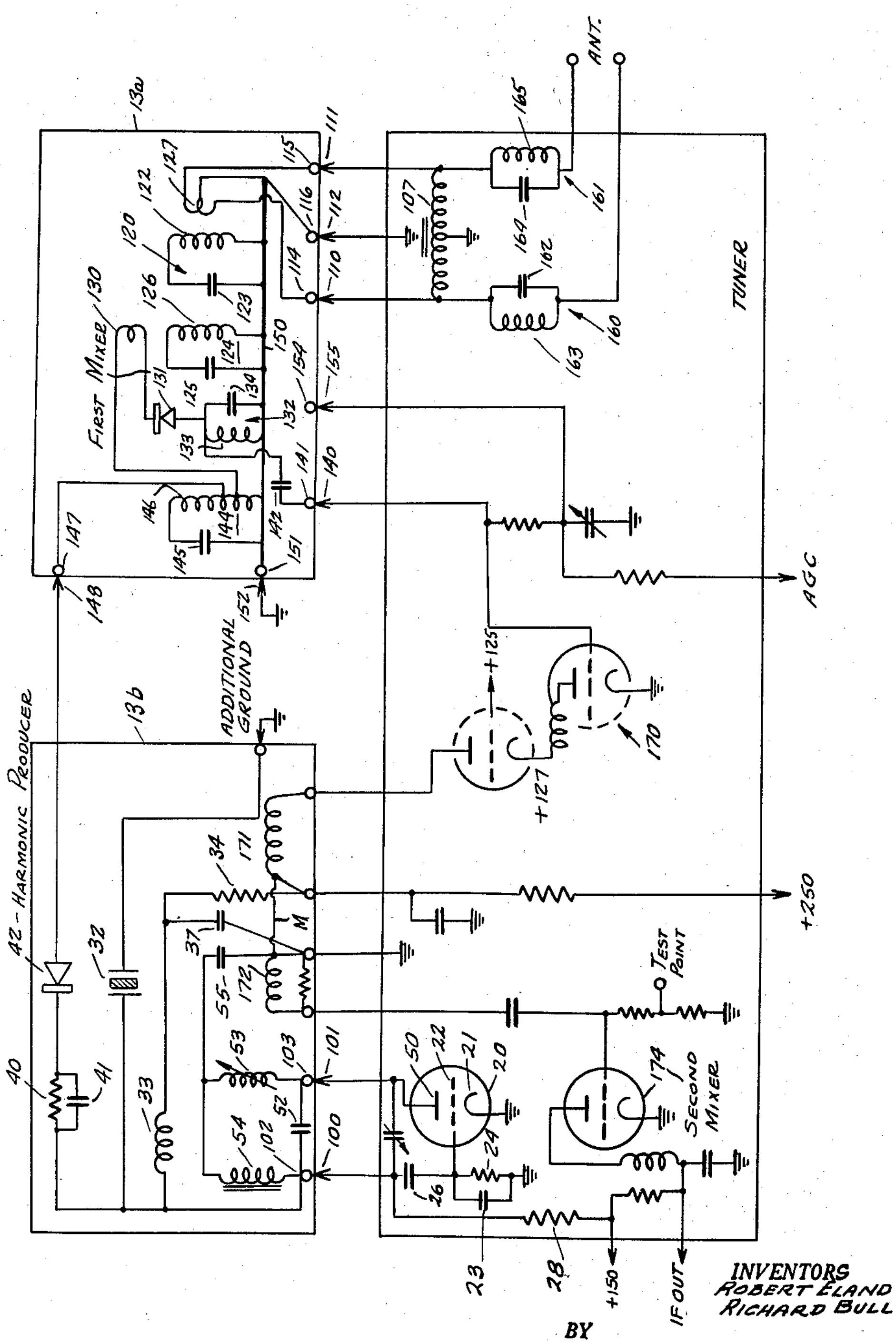
Figure 4 is a schematic circuit diagram of a television tuner incorporating the circuit of the present invention.

Referring now to Figure 4 showing a complete television tuner incorporating the circuit of the present invention, the elements described in connection with Figures 2 and 3 have been here given the same numerals.

The U. H. F. signal from the antenna is applied to the television tuner input circuit consisting of balanced parallel L–C circuits 160 and 161. Circuit 161 comprises a capacitance 162 and an inductance 163, while tuned circuit 161 consists of capacitance 164 and inductance 165.

Circuits 160 and 161 are connected to an inductance 107 having its center tap connected to ground. The U. H. F. signal after passing through circuits 160 and 161 is introduced into the frequency selective circuits mounted on panel **13*a*** which represents the antenna or R. F. panel for the present television tuner.

More particularly, the U. H. F. signal appears across the stationary contacts 110 and 111 with the center contact 112 connected to ground. From stationary contacts 110, 111 and 112 the U. H. F. signal is fed into the movable contacts 114, 115 and 116 which are mounted on panel **13*a*. Connected across contacts 114 and 115 is an antenna coil 127 having its center tap connected to movable contact 116 and, therefore, during engagement of panel 13*a*** with the stationary circuit of the present television tuner, it will be grounded.

Antenna coil 127 is mutually coupled to a first tuned circuit 120 consisting of capacitance 123 and inductance 122 connected in parallel. Tuned circuit 120 is in turn mutually coupled to tuned circuit 124 which also consists of a capacitance 125 and an inductance 126. Tuned circuits 120 and 124 are both coupled also to the coil 130 of crystal mixer 131.

Crystal mixer 131 is connected on one side to coil 130 and on the other to the L–C parallel circuit 132 consisting of inductance 133 and capacitance 134. From the high side of tuned circuit 132 is derived the first intermediate frequency signal which may, for example, be at 150 megacycles. This signal appears now at stationary contact 140 through engagement with movable contact 141. Connected between the movable contact 141 and the high side of tuned circuit 132 is the coupling capacitor 142.

Connected to the other side of the mixer winding 130 is a tuned circuit 144 for the harmonic generator crystal 42. Tuned circuit 144 consists also of a capacitance 145 in parallel with an inductance 146. Inductance 146 is provided with two taps, one of which is connected to coil 130 of crystal mixer 131, while the other is connected to the harmonic generator crystal 42 through the engagement of movable contact 147 with stationary contact 148.

It will be noted that the ground is here provided by a metallic plate indicated schematically at 150 which is connected to a movable contact 151. When panel **13*a* is in an operative relation with the stationary circuit of the present television tuner, contact 151 engages stationary contact 152 which is always grounded, thereby making metallic plate 150** a ground plate as desired.

The same grounding action occurs also at the other end of the plate since the center tap of antenna coil 127 is connected not only to the movable contact 116 but also to the metallic plate at 150. Thus, the antenna panel **13*a*** of the present frequency selector is provided with the necessary ground for good operation at high frequencies.

It will also be seen from Figure 4 that panel **13*a* has an additional movable contact 154** which is inoperative or, in other words, is not connected to any useful circuitry.

In this position of the television tuner of the present invention, movable contact 154 is engaged by stationary contact 155. The function of stationary contact 155 is not related to this particular invention but to the operation of the present television tuner as a V. H. F. frequency selector in a manner now well known in the art.

Connected to stationary contact 148 is the output from the harmonic generator crystal 42 mounted on the second panel or oscillator converter panel **13*b* (see also Figure 1). Panel 13*b*** was essentially described in connection with Figures 2 and 3.

After the first mixing action at crystal mixer 131, a signal is applied to cascode amplifiers 170 of the type, for example, disclosed in the co-pending application Serial No. 211,959, filed February 20, 1951, and through mutual coupling between coils 53, 171 at the output of cascode amplifier 170 and coil 172 at the input of the second mixer 174, the signal is applied to the second mixer tube 174, at the output of which will appear the desired intermediate frequency, for example, 141 or 40 megacycles.

Since the circuits described in connection with these second mixing actions are well known in the art, they have not been described in detail.

As can now be seen from Figure 4, through the use of the novel crystal controlled oscillator circuit of the present invention, it is possible to obtain the desired signals at the correct frequencies and phase.

In the foregoing the invention has been described solely in connection with specific illustrative embodiments thereof. Since many variations and modifications of the invention will now be obvious to those skilled in the art, we prefer to be bound not by the specific disclosures herein contained but only by the appended claims.

We claim:

1. In a television tuner, an oscillator converter section, said oscillator converter section comprising a multi-element electron tube having a tuned circuit including an inductor electrically coupled between the plate and the grid of said tube, frequency controlling means connected between the grid of said tube and ground, said frequency controlling means comprising a piezo electric crystal, means for operating said piezo electric crystal at a high mechanical overtone, said means comprising an inductance connected in electrical shunt to said crystal, said tuned circuit being proportioned to select the electrical fundamental frequency corresponding to said overtone frequency, and incorporating a fine tuning device connected between the grid and the plate of said tube for varying the tuning of said tuned circuit and an electrical component also connected between the grid and the plate of said tube for limiting the frequency variation produced by operation of said fine tuning device.

2. In a television tuner, an antenna section and an oscillator converter section, said oscillator converter section comprising a multi-element electron tube having a tuned circuit including an inductor electrically coupled between the plate and the grid of said tube, frequency controlling means connected between the grid of said tube and ground, said frequency controlling means comprising a piezo electric crystal, means for operating said piezo electric crystal at a high mechanical overtone, said means comprising an inductance connected in electrical shunt to said crystal, said tuned circuit being proportioned to select the electrical fundamental frequency corresponding to said overtone frequency, and incorporating a fine tuning device connected between the grid and the plate of said tube for varying the tuning of said tuned circuit and an electrical component also connected between the grid and the plate of said tube for limiting the frequency variation produced by operation of said fine tuning device, said converter comprising a crystal harmonic generator, first means coupling the output from said oscillator tube to said crystal harmonic generator, a crystal mixer, second means coupling the output of said antenna section and the output of said harmonic generator to said crystal mixer, and a utilization circuit coupled to the output of said mixer for utilizing the translated signal appearing at the output of said mixer.

3. In a television tuner as claimed in claim 2, further including means connected to the said tuned circuit for increasing the plate voltage of said tube without exceeding the plate dissipation of said tube.

4. In a television tuner as claimed in claim 2, further including means connected to the said tuned circuit for increasing the plate voltage of said tube without exceeding the plate dissipation of said tube, said last mentioned means comprising a choke, the interwinding capacity of said choke producing negative feedback for improving the operation of said oscillator.

References Cited in the file of this patent

UNITED STATES PATENTS

| | | |
|---|---|---|
| 2,189,770 | Samuel | Feb. 13, 1940 |
| 2,486,355 | Bussard | Oct. 25, 1949 |
| 2,487,857 | Davis | Nov. 15, 1949 |
| 2,567,860 | Schapiro | Sept. 11, 1951 |
| 2,596,117 | Bell et al. | May 13, 1952 |
| 2,676,258 | Laidig | Apr. 20, 1954 |

OTHER REFERENCES

Article: "Overtone Crystals—How and Where to Use Them," by Tilton in QST for March 1955, pages 16, 17, 120, 122, 124 and 126 of which only page 17 is cited.